United States Patent
Feng et al.

(10) Patent No.: US 8,487,044 B2
(45) Date of Patent: Jul. 16, 2013

(54) ORIENTED WHITE POLYESTER FILM

(75) Inventors: Ming-Cheng Feng, Tainan County (TW); Dan-Cheng Kong, Hsinchu (TW); Chang-Ming Wong, Hsinchu (TW); Shu-Ling Yeh, Taoyuan County (TW)

(73) Assignee: Industrial Technology Research Institute, Hsinchu County (TW)

( * ) Notice: Subject to any disclaimer, the term of this patent is extended or adjusted under 35 U.S.C. 154(b) by 294 days.

(21) Appl. No.: 12/953,475

(22) Filed: Nov. 24, 2010

(65) Prior Publication Data

US 2011/0123789 A1 May 26, 2011

(30) Foreign Application Priority Data

Nov. 25, 2009 (TW) .............................. 98140071 A

(51) Int. Cl.
*C08L 67/02* (2006.01)
(52) U.S. Cl.
USPC ............................ 525/165; 428/480; 428/327
(58) Field of Classification Search
CPC ..................................................... C08L 67/02
USPC .................... 525/165; 428/480, 327
See application file for complete search history.

(56) References Cited

U.S. PATENT DOCUMENTS

| 3,579,609 | A | * | 5/1971 | Sevenich et al. .............. 525/177 |
| 5,672,409 | A | | 9/1997 | Miyakawa et al. |
| 6,084,334 | A | | 7/2000 | Yamamoto et al. |
| 6,326,431 | B1 | | 12/2001 | Peiffer et al. |
| 6,641,924 | B1 | * | 11/2003 | Peiffer et al. ................. 428/480 |
| 6,984,322 | B2 | | 1/2006 | Shu et al. |
| 2002/0160215 | A1 | | 10/2002 | Peiffer et al. |

FOREIGN PATENT DOCUMENTS

| DE | 195 40 277 A1 | 5/1996 |
| EP | 1 795 399 A1 | 6/2007 |
| TW | 200635767 | 10/2006 |

OTHER PUBLICATIONS

Notification of examination opinion issued by the Taiwan Intellectual Property Office on Nov. 20, 2012, for the above-referenced application's counterpart application in Taiwan (Application No. 098140071).

* cited by examiner

*Primary Examiner* — Alicia Toscano
(74) *Attorney, Agent, or Firm* — Pai Patent & Trademark Law Firm; Chao-Chang David Pai

(57) ABSTRACT

The invention provides a oriented white polyester film, which includes at least one polyester film with a cavitation additive, wherein the cavitation additive includes poly(methyl methacrylate-co-methyl methacrylamide), a copolymer of sulfophthalate salt and nylon, polyarylate (PAR), ethylene methacrylate (EMA), ethylene methacrylate acrylic acid terpolymer (EMAAA), polyetherimide (PEI), metallocene catalyzed cyclic olefin copolymer (mCOC) or combinations thereof.

14 Claims, No Drawings

ORIENTED WHITE POLYESTER FILM

CROSS REFERENCE TO RELATED APPLICATIONS

This Application claims priority of Taiwan Patent Application No. 098140071, filed on Nov. 25, 2009, the entirety of which is incorporated by reference herein.

BACKGROUND OF THE INVENTION

1. Field of the Invention

The present invention relates to a white opaque film, and in particular relates to an oriented white opaque polyester film.

2. Description of the Related Art

A cavitation additive is added into a polyester film, and the polyester film is stretched by a uniaxial or a biaxial stretching process to form large fine voids in the polyester film. Following, a white polyester film having good whiteness and good opacity is obtained. A polyester film itself has high surface tension and high temperature resistance, thus, a polyester film is suitable for the printing, transcription and synthetic paper labeling fields, such as the packaging, building material, and commercial printing industries.

U.S. Pat. No. 5,672,409 discloses a biaxially oriented white polyester film which comprises poly(ethylene terephthalate) (PET) and a cavitation additive, wherein the cavitation additive comprises about 5-25 wt % of inorganic particles and 2-25 wt % of the polyolefin.

U.S. Pat. No. 6,326,431 discloses a biaxially oriented white polyester film which comprises poly(ethylene terephthalate) (PET) and a cavitation additive, wherein the cavitation additive comprises cyclic olefin copolymer.

However, when the inorganic particles are used as the cavitation additive, the inorganic particles are not easily dispersed well and may cause a dust pollution problem. Additionally, when the films are slitted during converting, the inorganic particles may cause slitting blade wear problems.

Accordingly, there is a need to develop an oriented white opaque polyester film, wherein the cavitation additive is dispersed well in the polyester film, and the dust pollution problem is avoided.

BRIEF SUMMARY OF THE INVENTION

The invention provides an oriented white polyester film, comprising: at least one layer of the white opaque polyester film with a cavitation additive, wherein the cavitation additive comprises poly(methyl methacrylate-co-methyl methacrylamide), a copolymer of sulfophthalate salt and nylon, polyarylate (PAR), ethylene methacrylate (EMA), ethylene methacrylate acrylic acid terpolymer (EMAAA), polyetherimide (PEI), metallocene based cyclic olefin copolymer (mCOC) or combinations thereof.

A detailed description is given in the following embodiments with reference to the accompanying drawings.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The invention provides a single-layered or multi-layered oriented white opaque polyester film, wherein at least one layer of the white opaque polyester film comprises polyester polymer and one of the following cavitation additives: poly(methyl methacrylate-co-methyl methacrylamide), a copolymer of sulfophthalate salt and nylon, polyarylate (PAR), ethylene methacrylate (EMA), ethylene methacrylate acrylic acid terpolymer (EMAAA), polyetherimide (PEI), metallocene catalyzed cyclic olefin copolymer (mCOC) or combinations thereof. The oriented white opaque polyester film comprises about 2-20 wt % of the cavitation additives, preferably 4-12 wt %, and more preferably 6-10 wt %. The polyester polymer of the white opaque polyester film comprises poly(ethylene terephthalate) (PET), poly(propylene terephthalate) (PPT), poly(butylene terephthalate) (PBT) or poly(cyclohexanedimethanol terephthalate) (PCT).

The sulfophthalate salt comprises Formula (I), (II), (III) or (IV):

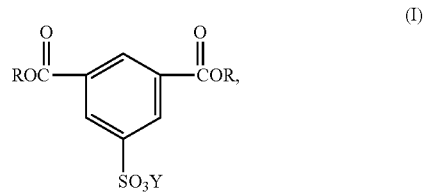

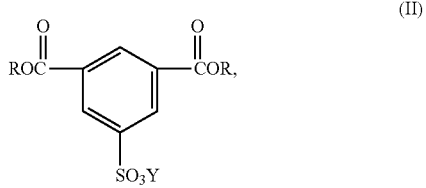

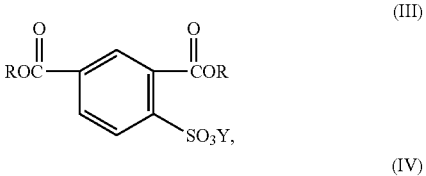

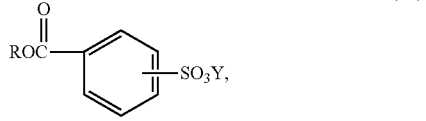

wherein each of R is independent and comprises H, C1-C10 alkyl or C1-C10 alkenyl, and each of Y is independent and comprises Na, K, Cs, Li or H.

The copolymer comprises about 0.1-5.0 mol % of the sulfophthalate salt, preferably 0.4-4.0 mol %, and more preferably 1.0-3.0 mol %. The nylon comprises nylon 6, nylon 6,6, nylon 4,6, nylon 6,10, nylon 6,12 or nylon 12.

The sulfophthalate salt comprises 5-sulfoisophthalate sodium salt or sodium dimethyl 5-sulphonatoisophthalate. Illustrative examples of the copolymer of sulfophthalate salt and nylon are such as a copolymer of 5-sulfoisophthalate sodium salt and nylon 6, a copolymer of 5-sulfoisophthalate sodium salt and nylon 6,6, a copolymer of 5-sulfoisophthalate sodium salt and nylon 4,6, a copolymer of 5-sulfoisophthalate sodium salt and nylon 6,10, a copolymer of 5-sulfoisophthalate sodium salt and nylon 6,12, a copolymer of 5-sulfoisophthalate sodium salt and nylon 12, a copolymer of sodium dimethyl 5-sulfoisophthalate sodium salt and nylon 6, a copolymer of sodium dimethyl 5-sulfoisophthalate sodium salt and nylon 6,6, a copolymer of sodium dimethyl 5-sulfoisophthalate sodium salt and nylon 4,6, a copolymer of sodium dimethyl 5-sulfoisophthalate sodium salt and nylon 6,10, a copolymer of sodium dimethyl 5-sulfoisophthalate sodium salt and nylon 6,12 or a copolymer of sodium dimethyl 5-sulfoisophthalate sodium salt and nylon 12.

The copolymer of sulfoisophthalate salt and nylon has a low viscosity and good flowability, therefore it is helpful to improve the dispersion of the polyester film. Additionally, the copolymer of sulfoisophthalate salt and nylon has a lower melting point than that of the unsulfonated nylon. Thus, the copolymer of sulfoisophthalate salt and nylon is fabricated at a lower temperature to have a better flowability.

The polyester film itself has high temperature resistance and good dimensional stability. Furthermore, by adding the organic cavitation additives into the polyester film, the oriented white opaque polyester film of the invention may be implemented in a wide range of applications and the dust pollution problem in prior art is avoided. In addition, because the polarity of the polyester film and that of the organic cavitation additives are close to each other, they are evenly mixed when prepared. Thus, the uniformity of film opacity is also improved.

The polyester film may be stretched by a uniaxial or a biaxial stretching process to obtain a uniaxially oriented white polyester film or a biaxially oriented white polyester film having a thickness of 12-150 μm, and preferably 25-75 μm, and having a drawing temperature of about 70° C.-150° C. When the oriented white polyester film is the uniaxially oriented white opaque polyester film, it has a drawing ratio of 3.0-10.0 times. When the oriented white opaque polyester film is a biaxially oriented white opaque polyester film, it has a drawing ratio of 3.0-6.0 times in a machine direction (MD), and a drawing ratio of 3.0-10.0 times in a transverse direction (TD).

The oriented white polyester film has: a porosity of about larger than 10%, and preferably of about larger than 20%; a luminance (L value) of about larger than 50%, and preferably of about larger than 70%; a light transmittance of about lower than 50%; a whiteness of about larger than 50%, and preferably about larger than 70%; and a density of about lower than 1.1 g/cm$^3$.

The oriented white opaque polyester film may be a single layer or multi-layered structure. The multi-layered oriented white opaque polyester film comprises a core layer of the cavitated polyester film, skin layers which are polyester films without adding any cavitation additives or polyester films with other cavitation additives, different from the above-mentioned cavitation additives in the core layer. The single layer of the oriented white polyester film of the invention may be laminated with one or more layers in any order, and the thickness of each layer can be the same or different. In one embodiment, the oriented white opaque polyester film of the invention is sandwiched between upper and lower skin layers, wherein the upper and lower skin layers are polyester films without any cavitation additives. In another embodiment, the oriented white polyester film of the invention is sandwiched between upper and lower skin layers, and the upper and lower layers are other polyester films using metallocene catalyzed cyclic olefin copolymer (mCOC) as a cavitation additive. Note that the order and the thickness of each layer may be adjusted according to actual applications, and is not limited to the specific embodiments.

The oriented white polyester film of the invention has good uniformity of opacity and causes no dust pollution problems, thus it may be fabricated into synthetic paper, widely used in the label, wrapping paper, bag, wallpaper, ticket, outdoor advertising, poster, or map fields, or other fields.

EXAMPLE

Example 1

A composition of about 90 wt % of poly(ethylene terephthalate) (PET) and 10 wt % of poly(methyl methacrylate-co-methyl methacrylamide) was stretched to form a single layer of biaxially oriented white polyester film having a drawing ratio of 3.0×3.0 times and a drawing temperature of about 75. The single-layered oriented white polyester film had a luminance (L value) of about 85.02%, and a whiteness (WI E313) of about 79.17%.

Example 2

The composition of about 90 wt % of poly(ethylene terephthalate) (PET) and 10 wt % of copolymer of 5-sulfoisophthalate sodium salt monosodium salt and nylon was stretched to form a single layer of biaxially oriented white polyester film having a drawing ratio of 3.0×3.0 times and a drawing temperature of about 75° C. The single-layered oriented white polyester film had a luminance (L value) of about 86.56%, and a whiteness (WI E313) of about 80.01%.

Example 3

The composition of about 90 wt % of poly(ethylene terephthalate) (PET) and 10 wt % of metallocene catalyzed cyclic olefin copolymer (mCOC) (Topas 6013) was stretched to form a single layer of biaxially oriented white polyester film having a drawing ratio of 3.0×3.0 times and a drawing temperature of about 72° C. The single-layered oriented white opaque polyester film had a luminance (L value) of about 83.94%, and a whiteness (WI E313) of about 77.84%.

Example 4

The compositions of three-layered oriented white opaque polyester film were prepared as following: the middle core layer was about 90 wt % of poly(ethylene terephthalate) (PET) and 10 wt % of poly(methyl methacrylate-co-methyl methacrylamide), and the upper and lower layers were poly(ethylene terephthalate) (PET) without adding any cavitation additives. The above compositions were stretched to form three layers having a drawing ratio of 3.0×3.0 times, and a drawing temperature of about 78° C. The three layers had a luminance (L value) of about 85.45%, and a whiteness (WI E313) of about 78.96%.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:
1. An oriented white opaque polyester film, comprising:
at least one layer of the white opaque polyester film with a cavitation additive,
wherein the cavitation additive comprises poly(methyl methacrylate-co-methyl methacrylamide).

2. The oriented white opaque polyester film as claimed in claim 1, wherein the oriented white opaque polyester film is single-layer or multi-layer.

3. The oriented white opaque polyester film as claimed in claim 1, wherein the polyester film comprises poly(ethylene terephthalate) (PET), poly(propylene terephthalate) (PPT), poly(butylene terephthalate) (PBT) or poly(cyclohexanedimethanol terephthalate) (PCT).

4. The oriented white opaque polyester film as claimed in claim 1, wherein the cavitation additive further comprises metallocene catalyzed cyclic olefin copolymer (mCOC).

5. The oriented white opaque polyester film as claimed in claim 1, wherein the polyester film comprises 2-20 wt % of the cavitation additive.

6. The oriented white opaque polyester film as claimed in claim 1, wherein the polyester film comprises 4-12 wt % of the cavitation additive.

7. The oriented white opaque polyester film as claimed in claim 1, wherein the polyester film comprises 6-10 wt % of the cavitation additive.

8. The oriented white opaque polyester film as claimed in claim 1, wherein the oriented white polyester film has a thickness of 12-150 µm.

9. The oriented white opaque polyester film as claimed in claim 1, wherein the oriented white polyester film is a uniaxially oriented film or a biaxially oriented film.

10. The oriented white opaque polyester film as claimed in claim 9, wherein the uniaxially oriented film has a drawing ratio of 3.0-10.0 times.

11. The oriented white opaque polyester film as claimed in claim 9, wherein the biaxially oriented film has a drawing ratio of 3.0-6.0 times in a machine direction (MD), and a drawing ratio of 3.0-10.0 times in a transverse direction (TD).

12. The oriented white opaque polyester film as claimed in claim 1, wherein the oriented white polyester film has a drawing temperature of 70° C.-150° C.

13. The oriented white opaque polyester film as claimed in claim 1, wherein the oriented white opaque polyester film has a porosity of larger than 10%.

14. The oriented white opaque polyester film as claimed in claim 1, wherein the oriented white polyester film has a luminance (L value) of larger than 50%, light transmittance of lower than 50%, whiteness of larger than 50%, density of lower than 1.1 g/cm$^3$.

* * * * *